United States Patent [19]
Becker

[11] 3,910,624
[45] Oct. 7, 1975

[54] TRUCK BODY MOUNTING CLIP

[75] Inventor: Robert L. Becker, Louisville, Ky.

[73] Assignee: Dealers Truck Equipment Inc., Louisville, Ky.

[22] Filed: Apr. 2, 1974

[21] Appl. No.: 457,211

[52] U.S. Cl. .......................... 296/35 R; 105/366 R
[51] Int. Cl. ............................................. B62d 23/00
[58] Field of Search ............ 296/35 A, 35 R, 28 M; 248/361 R, 228; 52/23; 105/366 R, 366 E

[56] References Cited
UNITED STATES PATENTS

| | | | |
|---|---|---|---|
| 1,630,145 | 5/1927 | Travis | 296/35 R |
| 1,662,539 | 3/1928 | Schmidt | 248/228 |
| 1,764,697 | 6/1930 | Shlager et al. | 248/228 |
| 2,595,352 | 5/1952 | Graham | 248/228 |
| 3,817,413 | 6/1974 | Ham | 296/35 A |

Primary Examiner—Robert J. Spar
Assistant Examiner—Gary Auton
Attorney, Agent, or Firm—Lowe, King & Price

[57] ABSTRACT

A mounting clip formed by two substantially identical clamp members is provided for securing mountable highway bodies or equipment onto the chassis rails of a vehicle. A leg of a first clamp member is positioned between the equipment and the rail and welded to the former. A complementary clamp member attached to the first clamp member secures the first clamp member to the rail by bearing against the underside of the rail. The first clamp member acts as a spacer between the equipment and the rail. The mounting clip is positioned behind a rivet head on the chassis rail to provide a positive stop to prevent shifting of the mounted equipment during vehicle braking.

9 Claims, 3 Drawing Figures

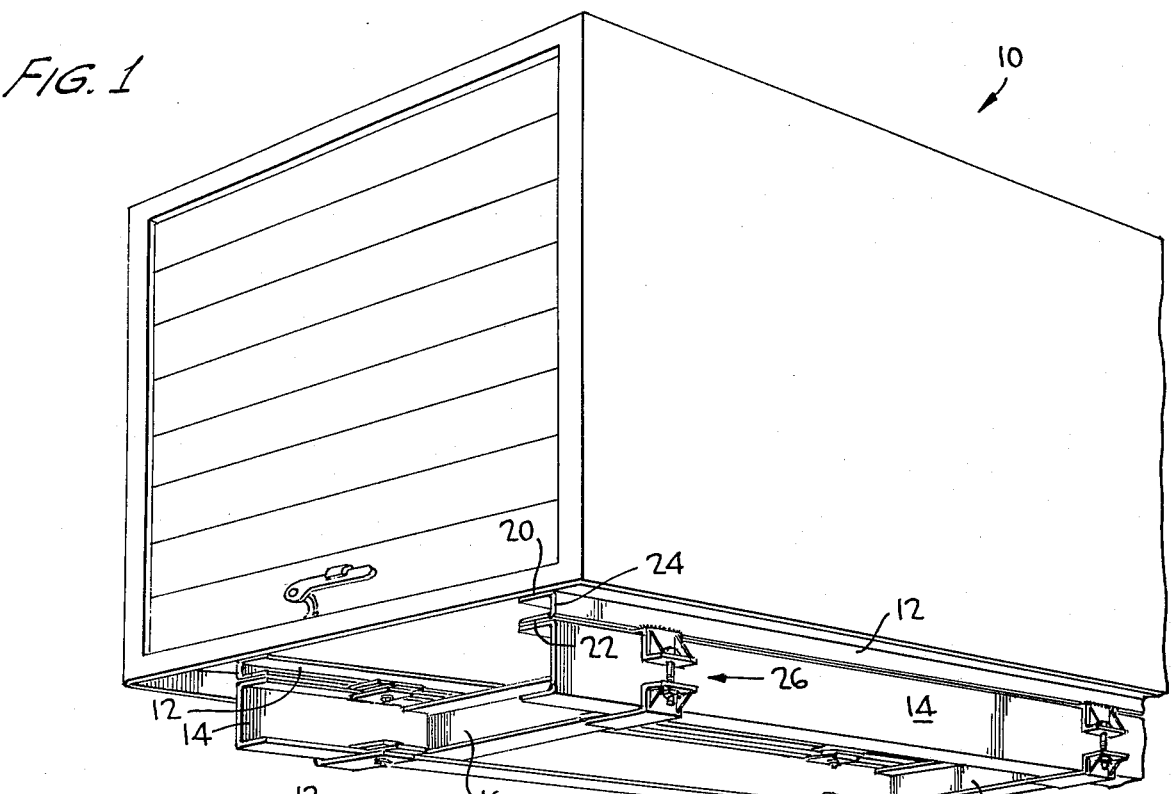
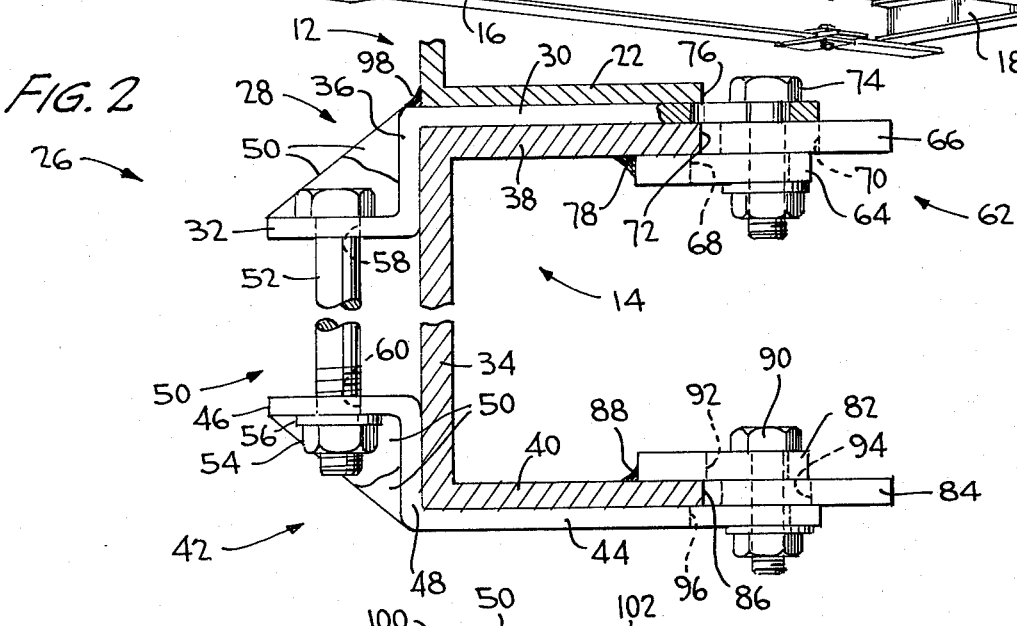
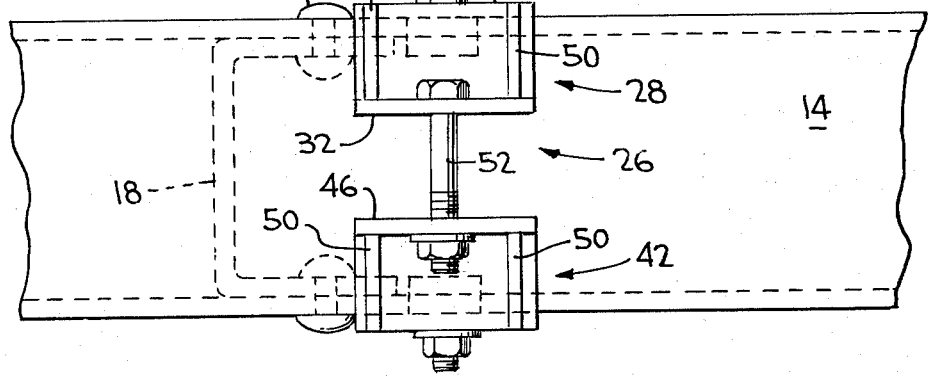

TRUCK BODY MOUNTING CLIP

BACKGROUND OF THE INVENTION

1. Field of the Invention

The present invention relates generally to a mounting clip for securing mountable highway bodies or equipment to the chassis rails of a vehicle, and more particularly to a mounting clip which both provides a secure connection between the equipment and chassis rails and serves as a spacer between the same.

2. Description of the Prior Art

In the past, it has generally been a practice to provide mounting clips for the purpose of securing mountable equipment, such as containers, onto the chassis rails of a vehicle. Generally, one type of mounting clip comprised a stud or bracket disposed vertically between the equipment and the chassis rails and secured to a vertical wall of a mounting rail on the equipment. The other end of the stud or bracket has typically been secured to the side face of the rail. Another type of mounting clip commonly used in the past has been a U-bolt which simply encompassed the mating rails and was drawn down tight to grip said rails. In this way, the U-bolt held down the equipment and relative sliding action was resisted by the frictional engagement between the clamped parts. While generally somewhat satisfactory for some applications, these mounting clips used heretofore had certain disadvantages.

For example, because the mounted equipment was adapted to directly abut the chassis rails of the vehicle, a wooden stud was generally required as a spacer between the equipment and rails. In addition, because the mounted equipment was only in frictional engagement with the chassis rails and intervening spacer, in order to prevent a shifting of the mounted equipment upon braking of the vehicle, additional brackets were often required to secure the assembly together. Also, because the clip was often mounted directly to the outer wall of the mounting rail of the equipment and the chassis rail, the walls had to be pierced by fastening means such as bolts, which was time consuming and expensive to do.

As another disadvantage, in the prior art, the mounting clips were comprised of several different and non-standard parts, some of which had to be specially manufactured.

Finally, the U-bolt type mounting clips of the prior art were relatively difficult to install and remove from the chassis rails, since one leg had to be bent outwardly to allow it to be threaded between the mounting rail and the bottom of the equipment and then bent back to embrace the rail. The U-bolt was often weakened by this bending process and failure sometimes resulted. Also, a relatively large supply of different size U-bolts had to be kept on hand by the jobber in order to service different size trucks.

SUMMARY

Accordingly, one object of the present invention is the provision of a new and improved mounting clip for securing mountable bodies or equipment onto the chassis rails of a vehicle.

Another object of the present invention is the provision of a new and improved mounting clip for securing mountable equipment onto the chassis rails of a vehicle without the requirement of an additional spacer between the equipment and rails.

Yet another object of the present invention is the provision of a new and improved mounting clip which effects an improved physical connection between the equipment and chassis rails and prevents a shifting or sliding forward of the mounted equipment during vehicle braking without requiring additional bracing.

Still another object of the present invention is the provision of a new and improved mounting clip which secures equipment to the chassis rails without penetrating the walls of the equipment.

Yet another object of the present invention is the provision of a new and improved mounting clip which is easy to install and economical to manufacture.

Yet another object of the present invention is to provide an improved mounting clip including essentially only two adjustable clamp members with interchangeable parts and a standard bolt and nut assembly.

These and other objects of the present invention are attained, in one aspect, by the provision of a mounting clip comprising first and second complementary clamp members which are mounted on opposite sides of a vehicle chassis rail. The clamp members are maintained in a vertically aligned relationship by fastener means and the equipment to be mounted is welded to the first clamp member. The top member advantageously serves as a spacing means between the equipment and the rail. The clamp members are interchangeable and include interchangeable spacer and retainer plates for both securing and aligning the equipment with respect to the rail. The spacer abuts the inside edge of the rail and the retainer means is preferably welded thereto to further assist in preventing relative movement of the equipment with respect to the rail. The spacer and retainer plates are rotatably positioned 180° with respect to each other. Each mounting clip is positioned immediately behind a positive stopping means, such as a rivet head, on the chassis rail to thus prevent longitudinal shifting of the mounted equipment during vehicle braking.

BRIEF DESCRIPTION OF THE DRAWING

These and other objects and advantages of this invention will be readily appreciated as the same becomes better understood by reference to the following detailed description when considered in connection with the accompanying drawings, in which like reference numerals designate like parts throughout the figures thereof and wherein:

FIG. 1 is a perspective view of a container body mounted to the chassis rails of a vehicle with the mounting clips of the present invention;

FIG. 2 is a cross-sectional view of the mounting clip and rail taken along the line 2—2 of FIG. 1; and FIG. 3 is a side view of the mounting clip of FIG. 1.

DESCRIPTION OF THE PREFERRED EMBODIMENT

Referring now to the drawings and more particularly to FIG. 1 thereof, a piece of mountable equipment, such as a highway body or container body 10 including a pair of equipment mounting strips or rails 12 is attached to and mounted on chassis rails 14 of a vehicle (not shown) by utilizing the teachings of the present invention. Chassis braces 16 and 18 are typically connected between and secured to the chassis rails 14 in order to maintain the chassis rails 14 in a spaced apart relationship. Although a pair of chassis braces 16, 18 is shown in FIG. 1, it is to be understood that in practice any desired number could be utilized in accordance with standard chassis construction requirements.

The equipment mounting strips 12 may take the form of a C-shape having an upper leg 20, a lower leg 22, and a connecting web portion 24. The equipment mounting strips 12 are generally secured to the bottom surface of the equipment 10 by bolting. However, other means such as riveting or welding the mounting strips may be used, if desired.

The chassis rails 14 are in turn secured to the equipment mounting strips 12 with a clamp assembly or mounting clip 26 of the present invention. The mounting clip 26, shown in more detail in FIG. 2, comprises a first clamp member 28 having a first leg 30 positioned between one of the rails 14 and one equipment mounting strip 12. The first clamp member 28 further includes a second leg 32 displaced vertically from the first leg 30 and extending laterally from adjacent a vertical connector or web member of the chassis rail 14. The first leg 30 and second leg 32 are integrally formed with the vertical leg 36 of the first clamp member 28.

The chassis rail 14 also has a C-shaped cross section including a top leg 38 and a bottom leg 40 integrally formed with the connector or web member 34.

The first clamp member 28 is positioned along the top leg 38 of the chassis rail 14 with the vertical leg 36 abutting the connector member 34 of the chassis rail 14. A second clamp member 42 forms a clamp means to bear up against the underside of the bottom leg 40 of the chassis rail 14 and is substantially identical in shape to that of the first clamp member 28. The second clamp member 42 includes a first leg 44 and a second leg 46 integrally formed with a vertical leg 48. On both the first and second clamp members, a pair of reinforcing ribs or gussets 50 may be formed along and between the second legs 32, 46 and the vertical leg 36, 48 in order to provide an increased resistance to bending force applied to said second legs. The second clamp member 42 is positioned directly below the first clamp member 28 on the rail 14, as shown in FIG. 2. The vertical leg 48 abuts the connector or web member 34 of the chassis rail 14 thereby assuring alignment for the fastener means now to be described.

Thus, fastener 50 includes a bolt 52, a nut 54, and a washer 56 which could be a lock washer. The bolt 52 extends through vertically aligned apertures 58 and 60 in the second legs of the first clamp member 28 and the second clamp member 42, respectively, and causes the first clamp member 28 and second clamp member 42 to bear against the upper surface of the top leg 38 and the lower surface of the bottom leg 40 of the chassis rail 14, respectively, as the nut 54 is tightened.

A retainer means 62 is attached to the first leg 30 of the first clamp member 28 in order to secure the first leg 30 to the top leg 38 of the rail 14 and to properly space the first clamp member 28 with respect to the rail. The retainer means 62 includes a horizontal retainer plate 64 and a spacer plate 66, each plate containing vertically aligned apertures 68 and 70, respectively. The retainer plate 64 and the spacer plate 66 are substantially identical and substantially equal in thickness to that of the top leg 38; the apertures 68 and 70 being elongated for relative adjustment.

The spacer plate 66 may be used to space the first clamp member with respect to the chassis rail 14 with the vertical leg 36 securely abutting the member 34 of the rail by sliding the spacer plate 66 against a corresponding inside edge 72 of the top leg 38 until the vertical leg 36 is securely seated against the connector member 34. The horizontal retaining plate 64 is rotated 180° from the spacer plate 66. Thus, the long dimension of this plate is positioned toward the web member 34 to clamp the top leg 38 securely. A bolt and nut fastener combination 74 extends through an elongated aperture 76 in the first leg 30 in mating relationship with the elongated apertures 68 and 70 in the horizontal retainer plate 64 and the spacer plate 66, respectively. When the bolt and nut fastener combination 74 is tightened, the first leg 30 of the first clamp member 28 is secured to the top leg 38 of the chassis rail 14. A weld bead 78 may further secure the horizontal retaining plate 64 to the underside of the top leg 38 of the chassis rail 14.

In a similar way, the second clamp member 42 is secured to and properly spaced with respect to the bottom leg 40 of the chassis rail 14 with a second horizontal retaining plate 82 and a second spacer plate 84. The second horizontal retaining plate 82 is substantially identical to the second spacer plate 84 and is substantially equal in thickness to that of the bottom leg 40. Again, the vertical leg 48 of the second clamp member 42 is securely seated against the web member 34 of the chassis rail 14 by positioning the second horizontal retainer plate 82 and second spacer plate 84 toward the channel member 34; the second spacer plate 84 being turned 180° with respect to the retainer plate 82 and abutting a corresponding edge 86 of the bottom leg 40. A weld bead 88 may be applied between the second horizontal retainer plate 82 and the upper side of the bottom leg 40 of the rail 14. A bolt and nut fastener combination 90 extends through elongated apertures 92, 94 and 96 in the second retaining plate 82, the second spacer plate 84 and the second clamp member, respectively.

It is to be understood that while the horizontal retainer plates 64 and 82 are secured to the top and bottom legs of the chassis rail 14 by welding, only the fastener means 50 and bolt and nut fastener combinations 74 and 90 secure the first and second clamp member 28 and 42 to the chassis rail. Accordingly, the equipment can be easily removed from the chassis rails as may be required for servicing or replacement by simply removing the fastener means 50 and the bolt and nut fastener combination 74 associated with the first clamp member 28 before raising the equipment.

The equipment mounting strip or rail 12 is secured to the upper surface of the first leg 30 of the first clamp member 28 with a weld bead 98. This is an important feature since a part of the overall clip 26 of the invention is thus made an integral part of the equipment being mounted and shifting movement between these two parts is positively prevented. Also, when the first clamp member 28 is removed from the chassis rail, the equipment mounting strip 12 remains secured to the first leg 30. In addition, since the first leg 30 forms a spacer between the equipment mounting strip 12 and the top leg 38 of the chassis rail 14, the requirement of an additional spacer, such as a wooden spacer stud, is obviated.

FIG. 3 is a side view of the clip 26 of the invention mounted on the chassis rail 14. The clip 26 is positioned on the rail adjacent a stopping means, such as a rivet head 100 or the like, on the side of the stopping means nearer the rear of the vehicle (not shown) associated with the vehicle rail 14. The top of the stopping means 100 is preferably flush with the upper surface 102 of the first leg of the first clamp member 28. Accordingly, without the requirement of additional bracing, the stopping means 100 serves to positively prevent shifting movement of the equipment along the vehicle rail 14 when the vehicle is heavily braked, or is involved in a head-on collision.

The procedure for securing the equipment 10 to the chassis rails 14 using the securing apparatus or clip 26 of the present invention is desirably simple. The first clamp member 28 is positioned over the top leg 38 of the chassis rail 14. The spacer plate 66 is then moved toward the channel 34 until the spacer plate 66 abuts the first leg end 72 while the vertical leg 36 abuts the outer surface of the web member 34. The horizontal retainer plate 64 rotated 180° from the position of the spacer plate and is moved toward the web member 34 until the aperture 68 in the horizontal retainer plate 64 contacts the bolt and nut fastener combination 74. The bolt and nut combination 74 is then tightened and the horizontal retainer plate 64 is thereby secured to the lower surface of the top leg 38. Finally, a weld bead 78 may be added along the inside edge of the plate 64. This is repeated for each clip 26 needed. At this time, the equipment is lowered onto the chassis rails and the mounting rails 12 are secured to the upper surface of the first leg 30 by a weld bead 98 on each clip.

The second clamp member of each clip 26 is then aligned and secured against the lower surface of the bottom leg 40 of the rail 14 and similarly positioned with the second spacer plate 84, and secured with the plate 82 and the bolt and nut fastener combination 90.

To complete the clip 26, the bolt 52 is now inserted through the vertically aligned apertures 58 and 60 of the legs 32, 46 and the nut 54 is tightened to in order to cause the second clamp member to bear up against the bottom of the rail 14. The bolt and nut 90 is tightened and the weld bead 88 added, if desired.

It is to be noted that the first and second clamp members 28 and 42 are substantially identical parts and because elongated holes are provided in the horizontal retainer plates 64, 82, and spacer plates 66, 84, and these are corresponding apertures 70, 96 in the first and second clamp members, the components are easy to make and install and do not require close tolerances. The horizontal retainer plates are substantially identical in structure to the spacer plates so that only two different parts need be manufactured, i.e., the clamp member and the plate. The nut and bolt fastener combinations are conventional. Standard bolt lengths for the bolt 52 may be selected in accordance with the height of the rail 14. Also, if necessary, additional shims maybe used in conjunction with the spacer plates 66, 84 where the thickness of the rails 14 is increased, such as on the heavier duty trucks.

As can be seen from FIG. 1, the utilization of the clip or securing apparatus 26 of the present invention obviates the requirement of a wood spacer between equipment and vehicle rails thus reducing the number of components required for fastening the equipment to the vehicle rails and eliminating the problem of loosening of the mounting components when deterioration occurs in the wood. Furthermore, because the equipment mounting strips 12 are positively secured to the vehilce rails 14 by welding rather than by friction, and because the clips 26 are preferably mounted adjacent and to the rear of the stopping means 100, the strength of the connection between the equipment and the vehicle rails is greatly enhanced and any sliding forward of equipment is prevented. Also, because the clips 26 are not connected by fasteners directly to the equipment, the walls of the equipment need not be penetrated.

Obviously, many modifications and variations of the present invention are possible in light of the above teachings. For example, the reinforcing gussets or ribs 50, if not needed for the additional strength that they afford, may be modified or even omitted without departing from the broad spirit of this invention. It is therefore to be understood that, within the scope of the appended claims, the invention may be practiced otherwise than as specifically described herein, as set forth in the appended claims.

What is claimed is:

1. An apparatus for securing a mountable highway body on a vehicle comprising:
   chassis rails forming a part of the vehicle;
   said rails having a C-shaped cross-section including top and bottom horizontal legs;
   a clamp assembly for each of said rails;
   each assembly including a first clamp member having a first clamp leg positioned between one of said rails and said equipment, said first clamp leg thereby serving to space said rail from said highway body, means for securing said first clamp leg to said highway body, said first clamp member further having a second clamp leg extending laterally from the side of said one rail, bearing means between said first and second clamp legs, said bearing means positioned along the side of said C-shaped rail to prevent lateral shifting, retainer means attached to the first clamp leg and bearing on the edge of the horizontal leg of said rail to further prevent lateral shifting, means for tightening said retainer means thereby further securing said clamp members to said horizontal leg, fastener means on said second clamp leg; and
   clamp means bearing against the underside of said rail for attachment to said fastener means, said clamp means including a second clamp member and retainer means substantially identical to and positioned vertically from so as to be complementary to the first mentioned clamp member for balanced clamping, whereby combined functions of securing and spacing of said highway body with respect to said rails may be effected.

2. The apparatus of claim 1 wherein said first clamp leg and said second clamp leg of said clamp member are vertically spaced apart and connected by a vertical leg forming said bearing means, said vertical leg being substantially the same length as said second leg and bearing against the side of the rail.

3. The apparatus of claim 2 wherein said retainer means includes a horizontal retainer plate, said top leg and said retainer plate having mating holes, said tightening means comprising a bolt and nut fastener combination cooperating with said holes.

4. The apparatus of claim 3 wherein is further provided an apertured spacer plate positioned between said retainer plate and said first leg and being substantially equal in thickness to said top leg.

5. The apparatus of claim 4 wherein said retainer plate and said spacer plate are substantially identical, said plates being oppositely directed at substantially 180° to each other and having elongated holes for relative adjustment, said spacer plate being abutted against said top leg for positioning said vertical leg of said clamp member against the side of said channel.

6. The apparatus of claim 5 wherein said retainer plate is provided with a weld bead welded to the underside of said top leg of said rail.

7. The apparatus for claim 1 wherein said rail includes a stop means including a rivet head for preventing shifting of said highway body, said clamp member being positioned adjacent said rivet head.

8. An apparatus of claim 7 wherein said clamp member is positioned just to the rear of said rivet head, whereby to prevent forward shifting of said highway body under heavy braking.

9. The apparatus of claim 2 wherein is provided gusset member extending between said vertical leg and said second leg for further reinforcement.

* * * * *